March 14, 1961 D. R. YOUNG 2,975,366

PULSE WIDTH DISCRIMINATOR

Filed March 27, 1946 2 Sheets-Sheet 1

INVENTOR
DONALD R. YOUNG

BY M. D. Hayes

ATTORNEY

March 14, 1961 D. R. YOUNG 2,975,366

PULSE WIDTH DISCRIMINATOR

Filed March 27, 1946 2 Sheets-Sheet 2

INVENTOR
DONALD R. YOUNG

BY M. A. Hayes

ATTORNEY

United States Patent Office 2,975,366

Patented Mar. 14, 1961

2,975,366

PULSE WIDTH DISCRIMINATOR

Donald R. Young, Logan, Utah, assignor, by mesne assignments, to the United States of America as represented by the Secretary of the Navy Filed Mar. 27, 1946, Ser. No. 657,387

4 Claims. (Cl. 328—112)

This invention relates in general to electric circuits and more particularly concerns so called "decoder" circuits selective to input electric pulses of predetermined width for enabling associated circuits.

It is desirable that a radar beacon for navigation or identification purposes respond only to signals of electromagnetic energy which are transmitted by a searching object with the express purpose of interrogating the particular beacon. Among the ends desired are first, to avoid compromise or disclosure of the position of the beacon to hostile forces, and second, to prevent unnecessary operation of the beacon which might create an interrogation overload and inefficient functioning.

To obtain these ends, this invention provides decoder circuits which deliver an output signal to trigger associated circuits such as a beacon transmitter only when a pulse signal of the proper width is received from an interrogating transmitter.

An object of this invention is to provide a decoder circuit which delivers an output signal only when an input electric pulse of the proper predetermined width is applied.

Another object is to provide a decoder circuit for enabling associated circuits only when an input pulse signal of predetermined width is applied to the decoder circuit.

These and other objects and features of this invention will become apparent from the following detailed description taken together with the accompanying drawings in which.

Figure 1:
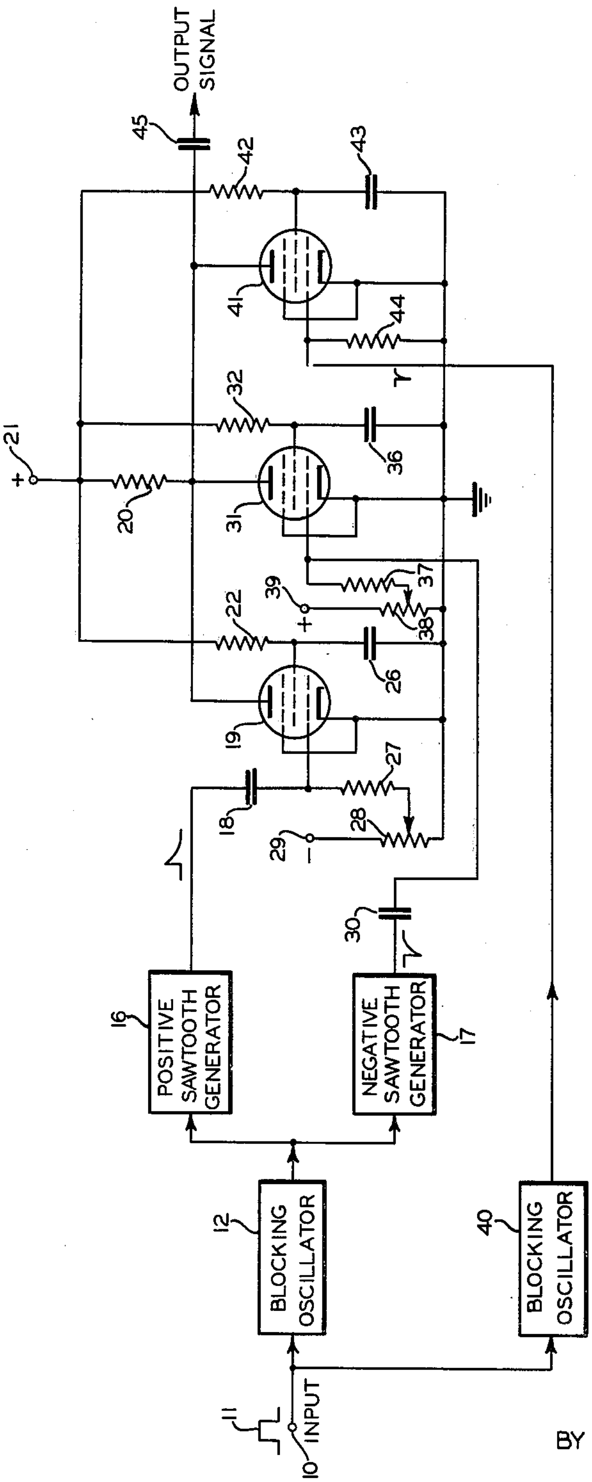
Fig. 1 illustrates one form of a pulse width decoder according to this invention.

Referring now to Fig. 1, terminal 10 is the point of input to the decoder circuit shown of a positive voltage pulse 11. Pulse 11 may be considered to be the video detected envelope of a high frequency pulse of electromagnetic energy received from a remote transmitter. The leading edge of pulse 11 triggers blocking oscillator unit 12 whose output pulse is applied to positive sawtooth voltage generator 16 and negative sawtooth voltage generator 17. In a simple form of conventional sawtooth generator, units 16 and 17 could comprise resistor-capacitor networks wherein the capacitors are charged abruptly by the output pulse from blocking oscillator 12 through low resistances and discharge through high resistances providing exponentially decaying voltages. An alternative form of sawtooth generator would provide for the output pulse from blocking oscillator 12 to trigger a switch controlling the charge and discharge of a resistor-capacitor network.

The positive sawtooth output voltage of unit 16 is coupled through capacitor 18 to the control grid of electron tube amplifier 19 shown as a pentode. The cathode of tube 19 is grounded and its plate is connected through plate resistor 20 to a source of positive potential at terminal 21. The suppressor grid of tube 19 is tied to the cathode. The screen grid of tube 19 is connected to terminal 21 through resistor 22 and is by-passed to ground through capacitor 26. The control grid of tube 19 is normally biased to cut-off by connecting it through resistor 27 to the slider arm of potentiometer 28, whose resistor strip is connected between ground and a negative potential applied at terminal 29. Thus, tube 19 is rendered conductive only during the time required for the positive sawtooth voltage output from unit 16 to decay to cut-off value at the control grid of tube 19.

The negative sawtooth output voltage of unit 17 is coupled through capacitor 30 to the control grid of tube 31. The plates of tubes 19 and 31 are tied together, as are their cathodes. The suppressor grid of tube 31 is tied to its cathode. The screen grid of tube 31 is connected to terminal 21 through resistor 32 and is by-passed to ground through capacitor 36. Tube 31 is normally conducting, having a positive bias on its control grid taken through resistor 37 connecting to the slider arm of potentiometer 38, whose resistor strip is connected between ground and a positive potential applied at terminal 39. Thus, tube 31 is rendered non-conductive during the time required for the negative sawtooth voltage output from unit 17 to decay to the region of conduction at the control grid of tube 31.

The trailing edge of pulse 11 triggers blocking oscillator unit 40 from which a negative output pulse is applied to the control grid of pentode 41. The cathode of tube 41 is grounded and the plate is tied to the plates of tubes 19 and 31. The suppressor grid of tube 41 is tied to the cathode. The screen grid of tube 41 is connected to terminal 21 through resistor 42 and is by-passed to ground through capacitor 43. Resistor 44 provides a D.C. return path to ground for the control grid of tube 41. Thus, tube 41 is normally conducting except when the negative trigger from blocking oscillator unit 40 drives tube 41 to cut-off.

Tubes 19, 31 and 41 comprise a coincidence circuit in that all three tubes must be cut off simultaneously in order for an output signal to be taken from the common junction of their plates through coupling capacitor 45. The positive sawtooth voltage applied to the control grid of tube 19 will not permit the coincidence circuit to operate during the time required for the positive sawtooth to decay to cut-off voltage. The negative sawtooth applied to the control grid of tube 31 will not permit the coincidence circuit to operate after the time required for the negative sawtooth voltage to decay to a value at which tube 31 again conducts. The time constants for decay of the positive and negative sawtooth voltage outputs of units 16 and 17 and the biases tapped off potentiometers 28 and 38 respectively for the control grids of tubes 19 and 31 can be adjusted, therefore, to allow both tubes to be cut off simultaneously at a predetermined interval of time following the leading edge of input pulse 11 which initiates the sawtooth voltages. Thus the action of tubes 19 and 31 can be considered to provide a gate or enabling signal at a predetermined time following the leading edge of input pulse 11. It will be seen that if the width of input pulse 11 is such that the trailing edge occurs coincidentally with the gating signal provided by tubes 19 and 31, the negative trigger output from blocking oscillator 40 will simultaneously cut off tube 41. With tubes 19, 31 and 41 cut off simultaneously, an output signal results at the junction of their plates coincidentally with the trailing edge of input pulse 11. Thus, the described circuit is one which is selective to input pulses of a predetermined width for providing output pulse signals that can be utilized to trigger or enable associated circuits. In this sense, a "decoder" circuit is provided.

It will be observed that tubes 19, 31 and 41 need not be pentodes but could be triodes or tetrodes as well.

Figure 2:
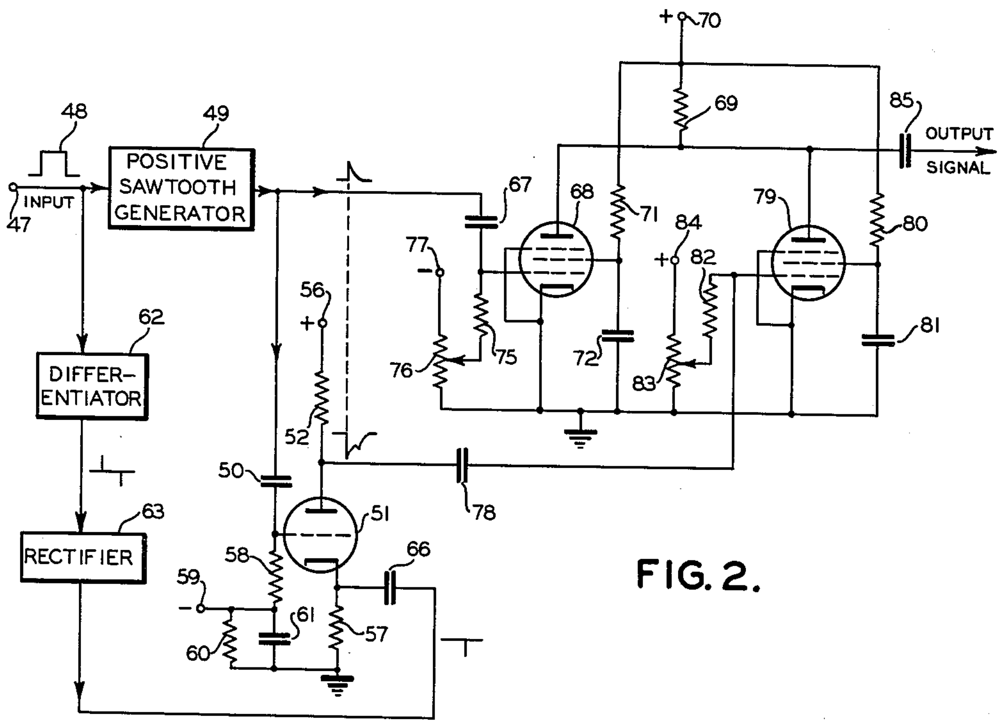
Fig. 2 illustrates an alternative form of decoder.

Fig. 2 illustrates another form of decoder embodying this invention. Terminal 47 is the point of input to the circuit of a positive voltage pulse 48 similar to pulse 11. The leading edge of pulse 48 triggers unit 49 which generates a positive sawtooth output voltage. The positive sawtooth voltage output of unit 49 is coupled through capacitor 50 to the control grid of triode 51 which provides a negative sawtooth output voltage at its plate. Plate potential for tube 51 is supplied through resistor 52 from a positive source connected at terminal 56. The cathode of tube 51 is grounded through resistor 57. The control grid of tube 51 is normally biased to cut-off potential through resistor 58 which connects to a source of negative potential at terminal 59. This operating bias is fixed by connection of resistor 60 and capacitor 61 in parallel between terminal 59 and ground.

Input pulse 48 is also differentiated by unit 62, providing a positive trigger coincident with the leading edge and a negative trigger coincident with the trailing edge of pulse 48. Rectifier unit 63 blocks the positive trigger, permitting only the negative trigger to be coupled by capacitor 66 to the cathode of tube 51. The positive sawtooth output voltage from unit 49 at the control grid of tube 51 causes tube 51 to conduct and to produce a negative sawtooth voltage at its plate. The negative trigger, coinciding with the trailing edge of pulse 48, applied to the cathode of tube 51 is equivalent to a positive trigger on the grid and causes a negative trigger to be superimposed on the negative sawtooth voltage at the plate of tube 51.

The positive sawtooth output voltage of unit 49 is also coupled through capacitor 67 to the control grid of pentode 68. The plate of tube 68 is connected through resistor 69 to a source of positive potential at terminal 70. The suppressor grid of tube 68 is tied to its cathode which is grounded. The screen grid of tube 68 is connected to terminal 70 through resistor 71 and is by-passed to ground through capacitor 72. The control grid of tube 68 is normally biased to cut-off by connecting it through resistor 75 to the slider arm of potentiometer 76 whose resistor strip is connected between ground and a negative potential applied at terminal 77. Thus, tube 68 is rendered conductive only during the time required for the positive sawtooth voltage output from unit 49 to decay to cut-off value at the control grid of tube 68.

The negative sawtooth voltage with superimposed negative trigger appearing at the plate of tube 51 is coupled through capacitor 78 to the control grid of pentode 79. The plates of tubes 68 and 79 are tied together as are their cathodes. The suppressor grid of tube 79 is tied to its cathode. The screen grid of tube 79 is connected to terminal 70 through resistor 80 and is by-passed to ground through capacitor 81. The control grid of tube 79 receives a positive bias by connecting it through resistor 82 to the slider arm of potentiometer 83 whose resistor strip is connected between ground and a positive potential applied at terminal 84. Thus, tube 79 is normally conducting except during the time required for the negative sawtooth with superimposed negative trigger voltage output from tube 51 to decay to the region of conduction at the control grid of tube 79.

Tubes 68 and 79 comprise a coincidence circuit since both must be cut off simultaneously in order for an output signal to result at the junction of their plates. The output signal is taken through coupling capacitor 85. Similarly to the circuit described in Fig. 1, in the circuit of Fig. 2, the positive sawtooth voltage which is applied to tube 68 coincidentally with the leading edge of input pulse 48 prevents the coincidence circuit from operating during the time required for the positive sawtooth to decay to cut-off voltage. The negative sawtooth voltage which is applied to tube 79 prevents the coincidence circuit from operating after the time required for the negative sawtooth to decay to a value at which, even with the superimposed negative trigger, tube 79 again conducts. The magnitude and rate of decline of the negative sawtooth voltage and the magnitude of the superimposed negative trigger can be adjusted so that the combined amplitude will not drive tube 79 to cut-off after a predetermined time following the leading edge of input pulse 48. Since the superimposed negative trigger occurs simultaneously with the trailing edge of input pulse 48, an input pulse longer than the predetermined time following the leading edge of input pulse 48 will not operate the coincidence circuit. Therefore, this circuit is an alternative form to that described in connection with Fig. 1 and is likewise selective to input pulses of a predetermined width for providing output pulse signals that can be utilized to trigger associated circuits.

Figure 3:
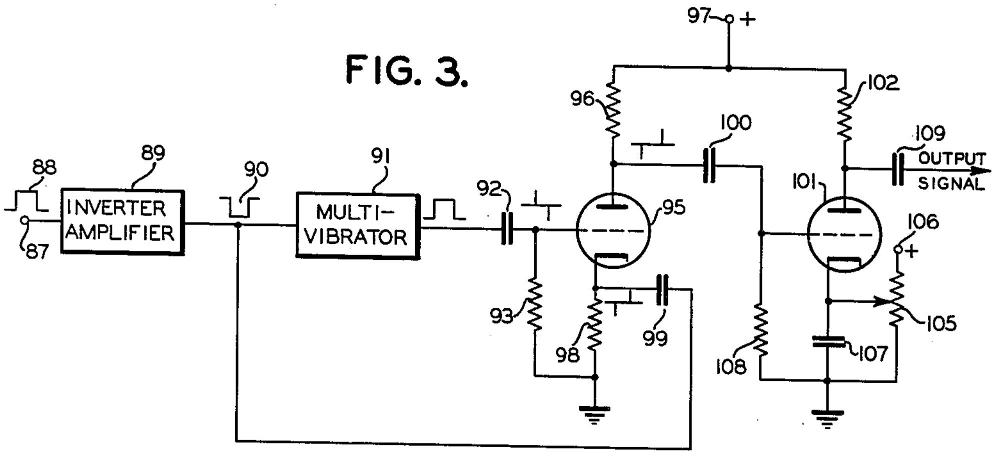
Fig. 3 illustrates a third form of decoder embodying this invention.

Fig. 3 illustrates a third form of decoder embodying this invention. Terminal 87 is the point of input to the circuit of a positive voltage pulse 88 similar to pulse 11. Pulse 88 is inverted and amplified by unit 89, which may be of conventional design, to provide negative pulse 90. The leading edge of pulse 90, which coincides with the leading edge of input pulse 88, triggers conventional multivibrator 91. Multivibrator 91 generates a positive voltage gate of predetermined width which is differentiated by capacitor 92 in series with resistor 93 to ground. By the term gate as used in this specification is meant a voltage pulse used for gating or otherwise enabling a succeeding circuit. The resultant positive and negative triggers appearing at the junction of capacitor 92 and resistor 93 are applied to the control grid of triode 95. The plate of tube 95 is connected through resistor 96 to a source of positive potential applied to terminal 97. The cathode of tube 95 is grounded through resistor 98. The negative output pulse 90 from unit 89 is coupled to the cathode of tube 95 through capacitor 99. Capacitor 99 and resistor 98 constitute a differentiating circuit for pulse 90 so that negative and positive triggers result at the cathode of tube 95 coincidentally with the leading and trailing edges respectively of input pulse 88.

Output signals from the plate of tube 95 are coupled by capacitor 100 to the control grid of tube 101. The plate of tube 101 connects to terminal 97 through plate load resistor 102. A fixed positive bias is placed on the cathode of tube 101 to cut the tube off. This bias is provided by connecting the cathode to the slider arm of potentiometer 105 whose resistor strip is connected between ground and a source of positive potential applied to terminal 106. Capacitor 107 by-passes the cathode of tube 101 to ground. The control grid of tube 101 is provided with a D.C. return path to ground by resistor 108.

Since tube 101 is normally cut off by the positive bias on its cathode, no signals result at its plate from the application of negative signals at its grid coupled from the plate of tube 95. Moreover, the cathode bias of tube 101 is so adjusted that a predetermined minimum positive signal voltage is required at its control grid to overcome the bias and to cause conduction, resulting in an output signal taken through coupling capacitor 109. Tube 95 is the coincidence amplifier in this circuit since it requires a negative trigger on its control grid simultaneously with a positive trigger on its cathode in order to achieve a positive trigger at its plate with sufficient amplitude to cause tube 101 to conduct and to provide an output signal. It will be seen that the width of input pulse 88 must be equal to the predetermined width of the gate output voltage of multivibrator unit 91 in order that the trailing edge negative and positive triggers therefrom respectively will coincide at the grid and cathode of tube 95 to achieve a positive plate pulse of the proper amplitude. Here again as for the circuits of Figs. 1 and 2, the output signal of the circuit from the plate of tube 101 coincides with the trailing edge of an input pulse 88 of predetermined width and the circuit decodes or is selective to pulses of the predetermined width.

Although there are shown and described only certain specific embodiments of this invention, the many modifications possible thereof will be readily apparent to those skilled in the art. Therefore, this invention is not to be limited except insofar as is necessitated by the prior art and the spirit and scope of the appended claims.

What is claimed is:

1. A pulse width decoder comprising, means responsive to the leading edge of an input electric pulse for generating positive and negative sawtooth voltages, means responsive to the trailing edge of said input pulse for providing a negative trigger signal, a first normally cut off electron tube amplifier adapted to receive said positive sawtooth voltage at its control grid, a second normally conducting electron tube amplifier adapted to receive said negative sawtooth voltage at its control grid, a third normally conducting electron tube amplifier adapted to receive said negative trigger signal at its control grid, and a common plate resistor for said amplifiers, the cathodes of said amplifiers being grounded, whereby when said input pulse has a predetermined width, said amplifiers are cut off simultaneously and an output signal results at the plates of said amplifiers coincidentally with the trailing edge of said input pulse.

2. For use in a pulse width discriminator the combination of, means responsive to the leading edge of an input pulse for generating in time coincidence a positive and negative saw-tooth wave, a first electron tube normally biased to nonconduction, a second electron tube normally biased to conduction, a third electron tube normally biased to conduction, means for coupling said positive and negative saw-tooth waves to the control circuits of said first and second tubes, respectively, whereby the conditions of conduction of said tubes are simultaneously reversed, said saw-tooth waves and the magnitudes of the biases applied to said first and second tubes being so proportioned that said second electron tube is maintained in a condition of nonconduction and said first electron tube is restored to a condition of nonconduction a specified time following the leading edge of said input pulse, means for rendering said third electron tube nonconducting at the time of occurrence of the trailing edge of said input pulse, and means responsive to a condition of nonconduction in said first, second and third electron tubes for producing an output pulse.

3. A pulse selector comprising, in combination, means responsive to the leading edge of an input pulse for generating in time coincidence saw-tooth waves of opposite sign, a first electron tube normally biased to a first mode of operation, a second electron tube normally biased to a second mode of operation, said modes of operation corresponding either to a state of tube conduction or nonconduction, means for coupling said saw-tooth waves to said tubes whereby said tubes shift their modes of operation simultaneously, a third electron tube normally biased to one of said modes of operation, a common load resistor for said electron tubes, means for correlating the magnitudes of the biases on said first and second electron tubes with the wave form of said saw-tooth waves whereby said first and second electron tubes are both in the same mode of operation only at a predetermined time following the leading edge of said input pulse, said predetermined time corresponding to the trailing edge of the pulse being selected, means responsive to the trailing edge of said input pulse for shifting the mode of operation of said third electron tube, and means responsive to the conjoint presence of similar modes of operation in all three electron tubes for producing an output pulse across said common load resistor.

4. A timing circuit for producing an output pulse a specified fixed time after the leading edge of each pulse in a pulse train which has at least a predetermined pulse length comprising, in combination, means responsive to the leading edge of each pulse in said pulse train for generating in time coincidence similarly shaped positive and negative saw-tooth voltage waves, said saw-tooth voltage waves having their vertical rise portions preceding their slope portions, a first electron tube biased to a state of nonconduction, a second electron tube biased to a state of conduction, a common load resistor connected to the plates of said electron tubes and to a source of operating potential, means for applying said positive and negative saw-tooth voltage waves coincidentally to the control electrodes of said first and second electron tubes, respectively, whereby the states of conduction of said tubes are reversed simultaneously, the magnitude and the slope of said saw-tooth voltage waves and the magnitude of the biases applied to said tubes being such that said first and second tubes are both in a state of nonconduction at said specified fixed time whereby an output pulse having its maximum amplitude at said specified time is produced across said common load resistor.

References Cited in the file of this patent

UNITED STATES PATENTS

| | | |
|---|---|---|
| 2,408,079 | Labin et al. | Sept. 24, 1946 |
| 2,418,127 | Labin | Apr. 1, 1947 |
| 2,441,964 | Grieg | May 25, 1948 |
| 2,493,648 | Watton et al. | Jan. 3, 1950 |

FOREIGN PATENTS

| | | |
|---|---|---|
| 528,192 | Great Britain | Oct. 24, 1940 |